United States Patent [19]

Terashita

[11] Patent Number: 4,658,661
[45] Date of Patent: Apr. 21, 1987

[54] TRANSMISSION FOR MOTOR THREE-WHEELERS

[75] Inventor: Shinji Terashita, Shizuoka, Japan

[73] Assignee: Yamaha Hatsudoki Kabushiki Kaisha, Iwata, Japan

[21] Appl. No.: 575,050

[22] Filed: Jan. 30, 1984

[30] Foreign Application Priority Data

Jan. 31, 1983 [JP] Japan ................................. 58-13923

[51] Int. Cl.⁴ .......................... F16H 3/08; F16H 5/06; F16H 57/06
[52] U.S. Cl. .................................... 74/331; 74/337.5; 74/359; 74/476
[58] Field of Search ...................... 74/331, 337.5, 358, 74/359, 477, 745, 476; 180/215, 226, 230

[56] References Cited

U.S. PATENT DOCUMENTS

| | | | |
|---|---|---|---|
| 2,958,225 | 11/1960 | Wagner | 74/477 X |
| 3,772,941 | 11/1973 | Nevett | 74/477 X |
| 3,894,443 | 7/1975 | Beig et al. | 74/477 X |
| 4,038,882 | 8/1977 | Keller | 74/331 |
| 4,373,601 | 2/1983 | Onda et al. | 180/230 X |
| 4,427,088 | 1/1984 | Tsuboi | 180/226 X |
| 4,455,884 | 6/1984 | Tsuruta et al. | 74/337.5 X |
| 4,463,823 | 8/1984 | Tsuboi | 180/230 X |
| 4,491,031 | 1/1985 | Ooka | 74/337.5 |

FOREIGN PATENT DOCUMENTS

| | | | |
|---|---|---|---|
| 1107092 | 5/1961 | Fed. Rep. of Germany | 74/331 |
| 1132172 | 3/1957 | France | 74/745 |
| 1199500 | 12/1959 | France | 74/359 |
| 461608 | 1/1971 | Japan . | |
| 52-50455 | 4/1977 | Japan | 74/359 |
| 56-49461 | 5/1981 | Japan . | |
| 12163 | 1/1982 | Japan | 74/477 |
| 154548 | 9/1982 | Japan | 74/337.5 |
| 161340 | 10/1982 | Japan | 74/476 |

Primary Examiner—Leslie Braun
Assistant Examiner—Joseph M. Rolnicki
Attorney, Agent, or Firm—Ernest A. Beutler

[57] ABSTRACT

A power unit for an axle having two or more driven wheels that permits the use of a conventional motorcycle power unit having an internal combustion engine and a change speed transmission having only forward gear ratios. An auxiliary transmission is coupled to the motorcycle power unit change speed transmission and itself includes two forward speeds and a reverse speed so that the vehicle may be driven in a forward or reverse direction. An interlocking arrangement is provided so that the auxiliary transmission cannot be shifted into reverse unless the change speed transmission is in either neutral or its lowest gear. In addition, the arrangement is such that a centrally positioned drive shaft may be employed.

3 Claims, 6 Drawing Figures

TRANSMISSION FOR MOTOR THREE-WHEELERS

BACKGROUND OF THE INVENTION

This invention relates to a transmission of motor three-wheelers and more particularly to an improved transmission for powered vehicles.

Most motorcycles are powered by a power unit that consists of an internal combustion engine and change speed transmission. The change speed transmission is frequently built into a common casing with the crankshaft of the engine and thus provides an extremely compact power unit. Because of the compactness of motorcycle power units, there are advantages to using such power units for propelling other types of motor vehicles. Specifically, the power unit of a motorcycle is particularly adaptable for use in off the road three wheel or four wheel vehicles. However, it is desirable with such three and four wheel vehicles to employ a reverse gear in the transmission. Most motorcycle transmissions do not employ a reverse gear. Therefore, it has been generally the practice not to provide a reverse gear when such power units are used with three and four wheel vehicles, thus somewhat limiting the adaptability of such vehicles when powered by a motorcycle power unit.

It is, therefore, a principal object of this invention to provide an improved transmission mechanism for adapting a motorcycle power unit to powering another type of wheeled vehicle.

It is a further object of this invention to provide an improved, simplified and yet compact transmission mechanism for a wheeled vehicle that includes a plurality of forward speeds and at least one reverse speed.

The output shaft of motorcycle power units normally extends out one side of the transmission and in generally parallel relationship to the drive shaft of the engine. Although such an arrangement has particular adaptability in connection with motorcycles, it tends to create some design problems when employed with wheeled vehicles having two rear wheels driven by the power unit. This is particularly true when the rear axle assembly is driven by a drive shaft from the motorcycle power unit.

It is, therefore, a still further object of this invention to provide a more compact arrangement for the transmission mechanism of a wheeled vehicle.

It is a further object of this invention to provide a power unit for a wheeled vehicle in which the drive shaft extends perpendicularly to the engine driven shaft.

SUMMARY OF THE INVENTION

A first feature of this invention is adapted to be embodied in a transmission mechanism for adapting the engine, change speed transmission of a motorcycle or the like to a reverse drive. The change speed transmission has a driven shaft. The transmission mechanism comprises a gear casing, an input shaft, means for drivingly coupling the input shaft to the change speed transmission driven shaft, an output shaft and means comprising a forward, reverse transmission assembly for selectively driving the ouput shaft in either a forward or reverse direction from the input shaft.

Another feature of the invention is adapted to be embodied in a power unit for a wheeled vehicle or the like. The power unit includes an internal combustion engine having an output shaft that is rotatable about a first axis. A change speed transmission is included that has primary and secondary shafts each rotatable about respective axes parallel to the first axis. Means are provided for driving the transmission primary shaft from the engine output shaft. Interengaging change speed gears on the primary and secondary shafts are included for driving the secondary shaft at any one of selected speed ratios from the primary shaft. The secondary shaft has output means at one of its ends. A drive shaft extends perpendicularly to the first axis and is positioned transversely between the ends of the secondary shaft. Means drive the drive shaft from the secondary shaft output member.

DETAILED DESCRIPTION OF THE PREFERRED EMBODIMENT

Figure 1:
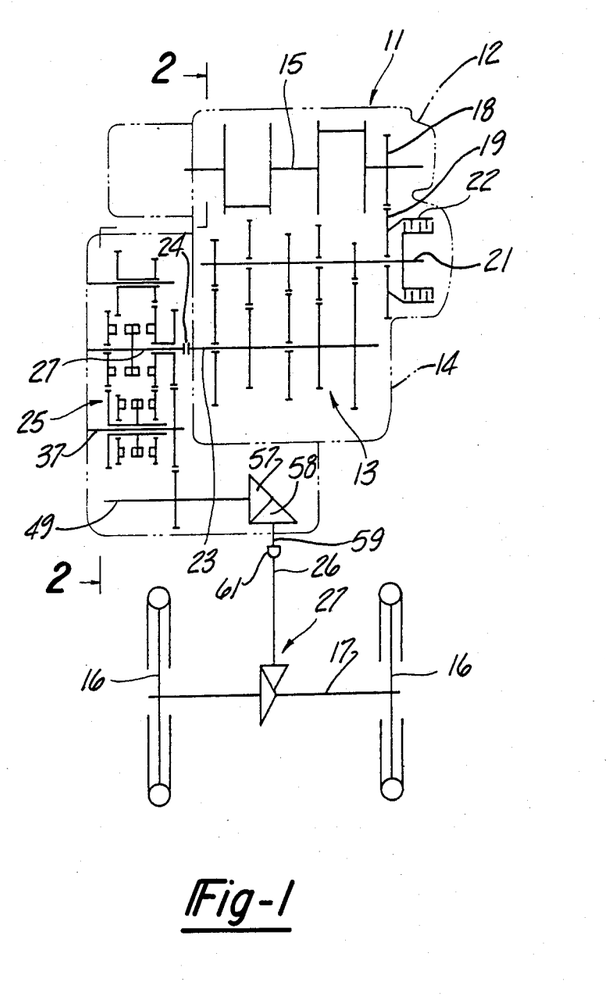
FIG. 1 is a schematic, top plan view of a power unit and associated driven axle of a motor vehicle constructed in accordance with an embodiment of the invention.

Referring first primarily to FIG. 1, what may be considered to be a conventional motorcycle power unit is identified generally by the reference numeral 11. The power unit 11 includes an internal combustion engine 12, which may be of any known type, and a primary transmission assembly 13. As is common with many motorcycle power units, the crankcase of the engine and the primary transmission 13 are contained within a common crankcase transmission housing assembly 14.

The engine 12 has an output or crankshaft 15 that is journalled for rotation in the crankcase housing 14 in a known manner. In accordance with a preferred embodiment of the invention, the axis of rotation of the crankshaft 15 is disposed transversely to the longitudinal axis of the vehicle with which the power unit 11 is used. This would normally be a motorcycle but in the illustrated embodiment, the power unit 11 is used to power a vehicle having a pair of wheels 16 that are affixed for rotation to a commn axle 17. The associated vehicle may have three or more wheels and may also be particularly adapted for off the road use.

A transfer gear 18 is fixed for rotation with the crankshaft 15 and meshes with a driven transfer gear 19 that is journalled on a primary shaft 21 of the change speed transmission 13. The driven transfer gear 19 is adapted to selectively drive the primary transmission shaft 21 through a manually operated clutch 22. A plurality of intermeshing gears are carried on the transmission primary shaft 21 and engage corresponding gears journalled on a transmission secondary shaft 23. The transmission primary and secondary shafts 19, 23, are disposed so that their rotational axes also extend transversely to the longitudinal axis of the vehicle and parallel to the axis of rotation of the crankshaft 15. The gears carried by the transmission secondary shaft 23 may be selectively coupled for simultaneous rotation with the secondary shaft 23 so as to drive it at a preselected ratio relative to the primary shaft 21. The shifting mechanism for accomplishing this is conventional and, for that reason, has not been illustrated. Although the transmission 13 may have any number of speed ratios, it is illustrated as being of the type which has five forward speeds.

The transmission secondary shaft 23 has its output end 24 extending through one side of the transmission crankcase housing assembly 14. It is normally this output end 24 that is used to transfer power to the rear wheel of a motorcycle when the power unit 11 is employed with such a vehicle. As is well known, most motorcycle power units do not include a reverse transmission gear and, therefore, the transmission assembly 13 only provides a series of forward gear ratios, which as has been aforenoted, is five in the illustrated embodiment.

In accordance with the invention, an auxiliary transmission unit, indicated generally by the reference numeral 25, is provided for transferring the drive from the transmission secondary shaft output end 25 to a drive shaft 26 which, in turn, drives the axle 17 through a final drive 27, which may be of the ring and pinion type. In accordance with the invention, the auxiliary transmission 25 is designed so as to provide a forward and reverse gear change. In addition, in the illustrated embodiment, the transmission 25 also provides a two speed forward drive ratio between the transmission secondary shaft 23 and the axle shaft 17.

Figure 2:
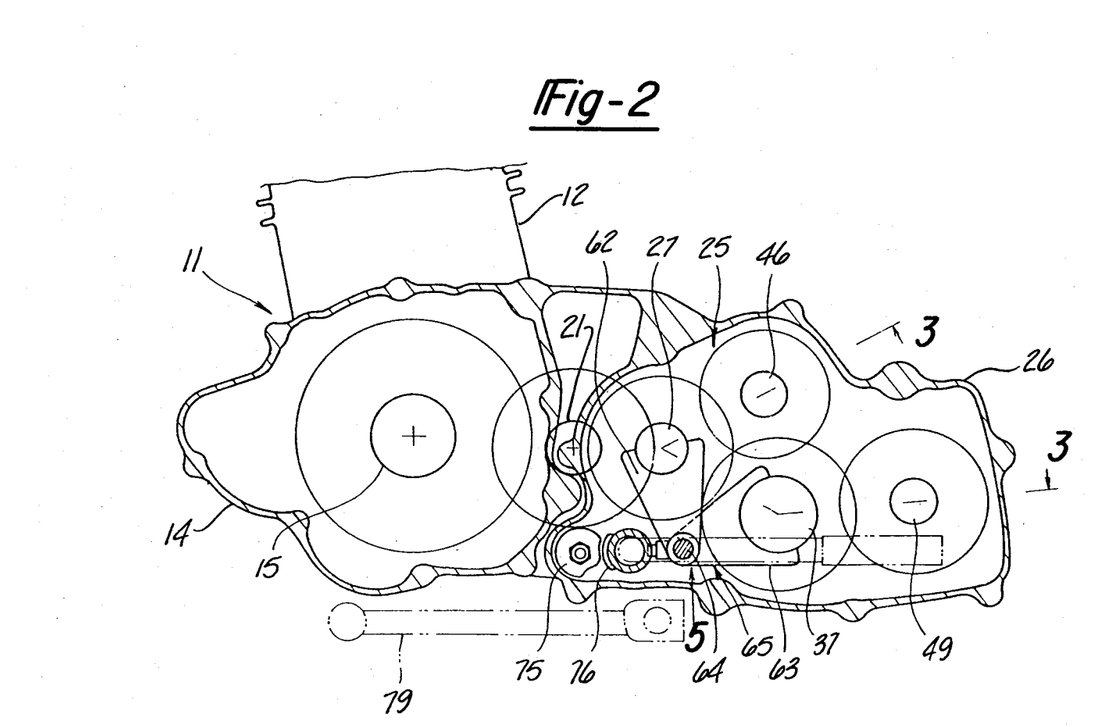
FIG. 2 is an enlarged, cross-sectional view taken along the line 2—2 of FIG. 1.
Figure 3:
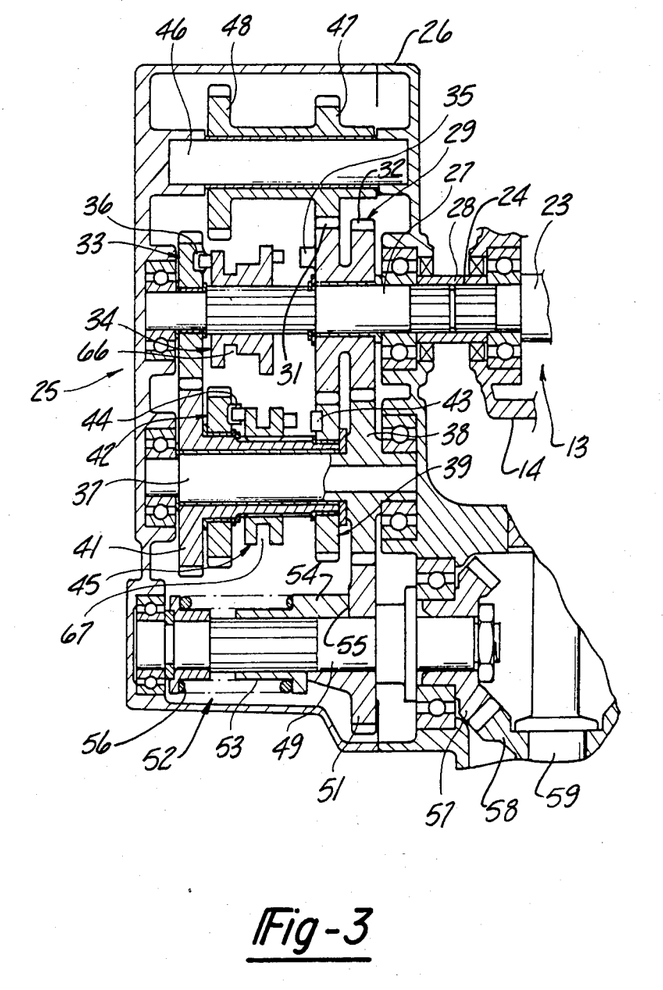
FIG. 3 is a cross-sectional view taken along the line 3—3, showing the forward, reverse transmission shifted into a reverse drive mode.
Figure 4:
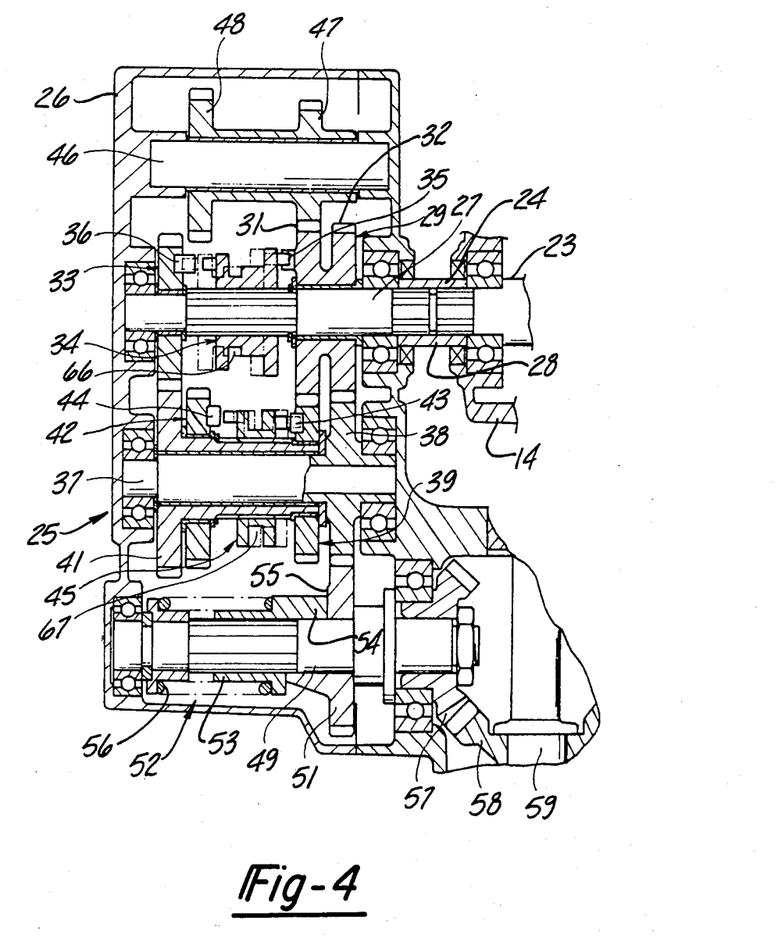
FIG. 4 is a cross-sectional view taken along the same plane as FIG. 3 and shows the transmission in a high speed forward drive mode in solid lines and a lower speed forward drive mode in broken lines.

Referring now additionally to FIGS. 2 through 4, the auxiliary transmission 25 includes an outer housing or casing assembly 26 that has a generally L shape in top plan. The auxiliary transmission includes an input shaft 27 that is disposed coaxially with the transmission secondary shaft 23 and is driven from its output end 24 by means of a splined coupling 28.

A first cluster gear 29 is journalled on the input shaft 27 adjacent its input end. This cluster gear 29 includes a first gear portion 31 and a second gear portion 32. Rotatably journalled on the opposite end of the input shaft 27 is a second gear 33. A dog clutch member 34 is splined for rotation with the input shaft 27 and may be axially moved so that its clutching jaws will selectively engage with jaws 35 formed on the gear cluster 29 or jaws 36 formed on the gear 33 so as to rotatably couple ether of these gears to the input shaft 27.

A second or lay shaft 37 is journalled in the auxiliary transmission housing 26 for rotation about an axis parallel to the axis of rotation of the input shaft 27 and, accordingly, parallel to the crankshaft axis and the axes of rotation of the main transmission primary and secondary shafts 21, 23. A first gear 38 is formed integrally with the shaft 37 and is in meshed with the gear 32 of the gear cluster 29. A second gear 39 is journalled on the lay shaft 37 adjacent to the gear 38. The gear 39 is in meshed with the gear 31. A still further gear 41 has an elongated hub portion which is journalled upon the lay shaft 37 and itself journals the gear 39. Yet another gear 42 is also journalled upon this hub portion adjacent the gear 41. The gears 39 and 42 have respective dog clutching teeth 43 and 44 that are adapted to be selectively engaged by a dog clutching element 45 that is slidably supported on the hub portion of the gear 41 and which is rotatably coupled to it by a spline connection.

A reverse gear shaft 46 is also supported within the auxiliary transmission housing 26 and has its axis parallel to the axes of the shafts 27 and 37. The reverse shaft 46 carries a cluster gear consisting of a first gear 47 that is in meshed with the gear 31 of the cluster 29 that is journalled on the input shaft 27. A second gear 48, affixed for rotation with the gear 47, is in meshed with the gear 42.

A final output shaft 49 is journalled in the auxiliary transmission housing 26 also with its axis of rotation parallel to that of the shafts 27, 37 and cluster gear assembly comprising the gears 47 and 48. A gear 51 is rotatably journalled on the shaft 49 and is coupled for rotation with it by means of an overload release device, indicated generally by the reference numeral 52. The overload release device 52 consists of a hub member 53 that is splined to the shaft 49 for rotation with it while permitting axial movement. The hub member 53 has one or more projections 54 that are received in recesses or pockets 55 formed in the gear 51. A coil compression spring 56 engages the hub member 53 for holding the projections 54 in engagement with the pockets 55 so as to rotatably couple the gear 51 to the shaft 49. However, if a high resistance to rotation of the shaft 49 is incurred, the hub member 53 will be axially cammed so that the projections 54 leave the recesses 55 and the spring 56 is compressed. This will discontinue the drive between the gear 51 and the shaft 49 until the obstruction is removed.

A bevel gear 57 is affixed to one end of the final output shaft 49 and is, in turn, in meshed with a bevel gear 58 that is fixed to an output shaft 59. The output shaft 59 extends perpendicularly to the other auxiliary transmission shafts and the output shaft 49 and is disposed approximately midway of the ends of the transmission secondary shaft 23. The shaft 59 is connected, by means of a coupling 61 such as a universal joint, to drive the drive shaft 26 and, accordingly, the axle 17 through the final drive 27. It should be noted that the configuration of the auxiliary tranmission 25 and the central location of the output shaft 59 relative to the power unit 11 permits an extremely compact assembly while at the same time permitting the axle shaft 17 to be driven at approximately its center.

Figure 5:
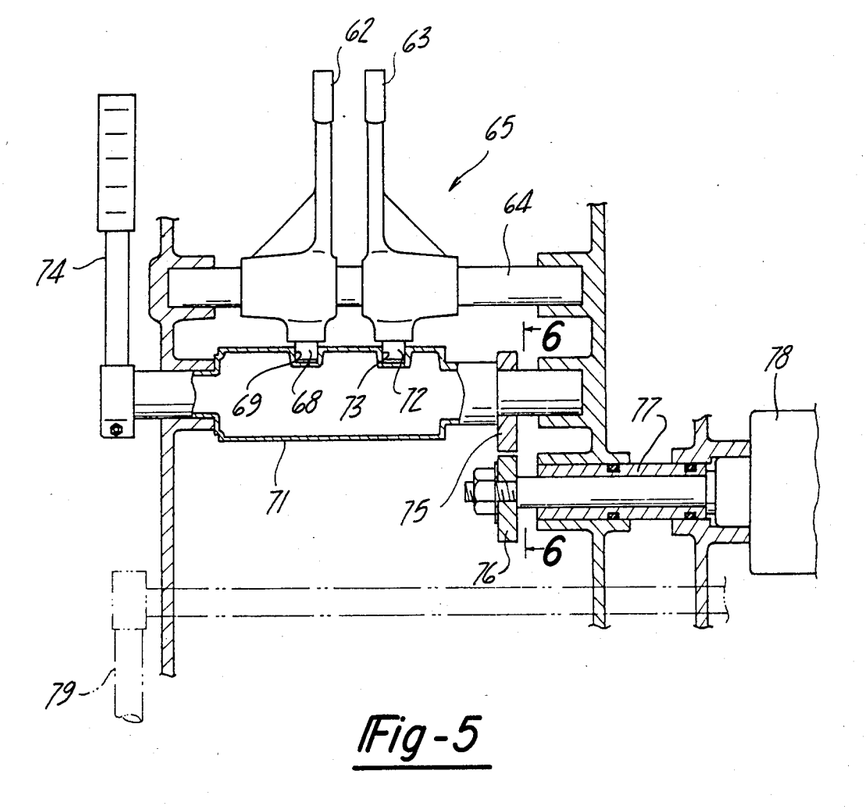
FIG. 5 is a enlarged, cross-sectional view showing the shift mechanism and is taken generally in the direction of the arrow 5 in FIG. 2.
Figure 6:
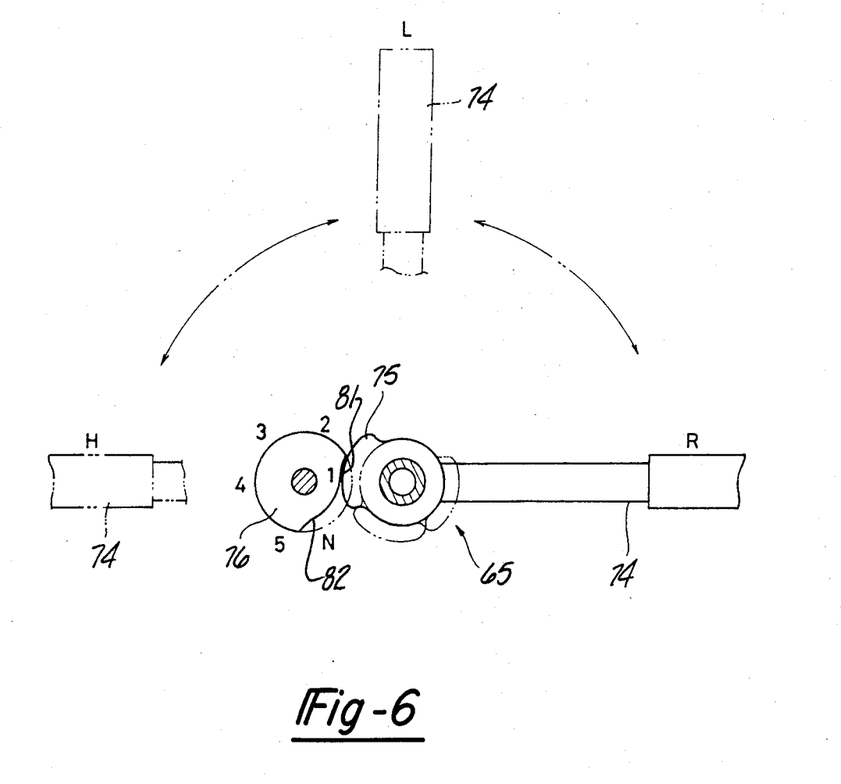
FIG. 6 is a cross-sectional view taken along the line 6—6 and shows the interlocking mechanism between the main and auxiliary transmissions.

The mechanism for shifting the dog clutches 34 and 45 of the auxiliary transmission 25 and their interrelation to the shifting mechanism of the primary transmission 13 may be best understood by reference to the remaining figures (FIGS. 5 and 6). A pair of shifting forks 62 and 63 are each slidably supported upon a shaft 64 of a shift assembly, indicated generally by the reference numeral 65. The forks 62 and 63 are axially movable on the shaft 64 independently of each other. The shifting fork 62 extends generally upwardly from the shaft 64 as best seen in FIG. 2 and has its upper forked end received in a groove 66 (FIGS. 3 and 4) of the dog clutch element 34. The shifting fork 63 extends rearwardly and has its rearwardly forked end received in a complementary groove 67 of the dog clutch element 45.

The shifting fork 62 has an integral lug 68 adjacent the supporting shaft 64 that is received in a cam groove 69 of a shifting cam 71. The shifting cam 71 is rotatably journalled in the transmission casing 26 in any suitable manner. In a like manner, the shifting fork 63 has a lug 72 that is received in another cam groove 73 of the shifting cam 71. The configuration of the grooves 69 and 73 is such that rotation of the cam 71 will effect axial movement of the forks 62 and 63 along the shaft 64 in the directions to be described. A shift lever 74 is affixed to the exposed end of the cam 71 so as to effect rotation of the cam 71 and shifting of the auxiliary transmission. As seen in FIG. 6, when the lever 74 is in a rearwardly directed position, the auxiliary transmission 25 will be in reverse. When the lever 74 is in a vertical position, the auxiliary transmission 25 will be in a low speed, forward drive range. When the lever 74 is rotated to its extreme forward position, the auxiliary transmission 25 will be in its high speed, forward drive position.

The solid line view in FIG. 6 and FIG. 3 shows the transmission in the reverse condition. In this condition, the dog clutch element 34 will be shifted so that the gear 33 is rotatably coupled to the input shaft 27. At the same time, the dog clutch element 45 will have been shifted by the shift fork 63 to the position wherein the gear 42 is rotatably coupled to the gear 41. When this ratio is selected, the auxiliary transmission input shaft 27 will rotate in the same forward direction as does the main transmission secondary shaft 23. The gear 33 will drive the gear 41 in a reverse direction and, as has been noted, the gear 42 will also be driven in this reverse direction. The gear 42 meshes with the gear 48 and thus drives the gear 48 and gear 47 in a forward direction. The gear 47 will drive the gear cluster 29 in a reverse direction. The meshing engagement between the gear 32 of this cluster and the gear 38 which is integrally formed with the shaft 37, will cause the shaft 37 to be driven in a forward direction. The gear 38 also drives the gear 51 and this gear will now be driven in a reverse direction so that the drive shaft of the vehicle 26 and the rear axle 17 will be driven in reverse.

To shift the auxiliary transmission 25 into its high speed forward drive condition, the lever 74 is rotated 180° to its forwardly extending position as shown in phantom lines in FIG. 6. When this rotation occurs, the cam grooves 69 and 73 will move the respective shift forks 62, 63, so that the dog clutch element 66 now couples the gear cluster 29 with the input shaft 27 as shown in the solid line view in FIG. 4. The dog clutch element 45 will be in a neutral condition so that neither of the gears 39 or 42 will be coupled to the hub of gear 41 as also shown in solid lines in FIG. 4. In this condition, the input shaft 27 drives the gear cluster 29 in the forward direction, the same direction of rotation as the main transmission secondary shaft 23. The gear 38 will be driven by the gear 32 of this cluster in a reverse direction and this gear will, in turn, drive the gear 51 and auxiliary transmission final output shaft 49 in the forward direction so that the dirve shaft 26 and axle 17 will rotate in the forward direction. The gears 32, 38 and 55 have approximately the same diameters and pitches so that this drive will be a substantially direct drive.

If the shift lever 74 is rotated to its vertically upstanding position, the shift forks 62 and 63 will be moved by the cam grooves 69 and 73 so that the dog clutch element 34 will couple the gear 33 to the input shaft 27 and the dog clutch element 45 will couple the gear 39 to the hub of the gear 41. This condition is shown by the broken line view in FIG. 4. With the gears so coupled, the input shaft 27 will drive the gear 33 which, in turn, drives the gear 41. Since the gear 39 is now coupled with the gear 41, it will be driven so as to drive the gear cluster 29 and transfer the drive back to the gear 38 which, in turn, drives the gear 55 in a forward direction. However, the gear train provides a lower ratio during this transfer. By lowr ratio, it is meant that there will be a gear reduction from the generally direct drive that is enjoyed when the shift lever 74 of the auxiliary transmission 25 is in the high gear position.

An interlocking arrangement is provided between the shifting mechanism of the auxiliary transmission 25 and the main transmission 13 that precludes shifting of the auxiliary transmission into reverse unless the main transmission 13 is in either neutral or first gear. This interlocking mechanism also precludes shifting of the primary transmission 13 out of first gear or neutral when the auxiliary transmission is in reverse. The mechanism, however, permits free shifting of the primary transmission 13 when the auxiliary transmission is in either its low or high forward drive conditions.

This interlocking mechanism consists of a cam lug 75 that is formed at one end of the auxiliary transmission shifting cam 71. A cam plate 76 is affixed to a shaft 77 of a shifting cam 78 of the primary transmission 13 in proximity to the cam lug 75. The shifting cam 78 controls the gear selection of the primary transmission 13 in a known manner and is rotatable through any of six different angular positions as indicated by the points N, 1, 2, 3 4 and 5 in FIG. 6, these corresponding to neutral, first gear, second gear, third gear, fourth gear and fifth gear, respectively. A shift lever 79 is provided for rotating the shifting cam 78 in a known manner.

A pair of recesses 81 and 82 are formed in the cam 76 at the neutral and first gear positions. The remainder of the surface of the cam 76 is generally circular. The recesses 81 and 82 are configured so as to permit the lug 75 to rotate through either of them when they are positioned in proximity to the lug 75. For example, FIG. 6 shows the main transmission in its first gear. In this condition, the cam lug 75 of the auxiliary shift lever 74 may freely rotate through the recess 81 so that the auxiliary transmission 25 may be shifted to any of its positions. The same is true when the primary transmission 13 is in neutral. In this condition, the recess 82 will freely pass the lug 75.

As may be seen from the phantom line positions of the lug 75, it will not interfere with rotation of the cam 76 when the auxiliary transmission shift lever 74 is in either its low or high speed position. Therefore, the main transmission 13 may be shifted to any of its five forward gears or to neutral when the auxiliary transmission is in either low or high forward drive. However, when the auxiliary transmission is in reverse, the main transmission can only be shifted from neutral to first gear or vice versa.

It should be readily apparent from the foregoing description that an effective transmission is provided which may be used with a motorcycle power plant so as to adapt it for use in driving vehicles having more than two wheels on a given driven axle. The arrangement permits the use of reverse and also two final drive speeds without causing any interference with the shifting of the main transmission of the motorcycle power unit. At the same time, an extremely compact arrangement results and the drive shaft may be positioned centrally of the power unit without enlarging the overall configuration of the power unit per se.

Although an embodiment of the invention has been illustrated and described, various changes and modifications may be made without departing from the spirit and scope of the invention, as defined by the appended claims.

I claim:

1. A power unit for a wheeled vehicle or the like having an internal combustion engine with an output shaft rotatable about a first axis, a change speed transmission having a primary shaft and a secondary shaft each extending parallel to said first axis, means for driving said primary shaft from said engine output shaft, intermeshing change speed gears on said primary and secondary shafts for driving said secondary shaft at one of selected speed ratios from said primary shaft, said secondary shaft driving output means at one of its ends, a driven shaft extending perpendicularly to said first axis and positioned transversely between the ends of said secondary shaft and means for driving said driven shaft from said secondary shaft output means, said means for driving the driven shaft from the secondary shaft output means comprises an auxiliary transmission having two different forward gear ratios and a reverse gear ratio, said auxiliary transmission comprising an input shaft, a lay shaft, a reverse shaft, an output shaft, said shafts extending parallel to each other and to the first axis, said input shaft being driven by the change speed transmission secondary shaft and said output shaft driving the driven shaft, a first cluster of first and second gears rotatably journaled on said input shaft, a third gear rotatably journaled upon said input shaft at a space location from said first cluster, first shfiting means interposed between said first cluster and said third gear for selectively coupling either of said first cluster and said third gear for simultaneous rotation with said input shaft, a fourth gear affixed for rotation with said lay shaft and in mesh with said second gear, a fifth gear rotatably journaled upon said lay shaft in mesh with said third gear, said fifth gear having a hub portion, a sixth gear rotatably journaled on said hub portion and juxtaposed to said fourth gear, a seventh gear rotatably journaled upon said hub portion and juxtaposed to said fifth gear, said sixth gear and said seventh gear being spaced apart, second shifting means interposed between said sixth gear and said seventh gear for selectively coupling either of said sixth gear and said seventh gear for simultaneous rotation with said fifth gear, a second gear clustr rotatably journaled upon said reverse shaft and comprising an eighth gear in mesh with said seventh gear and a ninth gear in mesh with said first gear, and means for driving said driven shaft from said fourth gear.

2. A power unit as set forth in claim 1 further including interlocking means for precluding shifting of the auxiliary transmission to its reverse condition unless the change speed transmission is either in neutral or its lowest gear.

3. An auxiliary transmission comprising a gear casing, an input shaft, a lay shaft, a reverse shaft, a final output shaft, and a driven shaft within said gear casing, said input shaft, said lay shaft, said reverse shaft and said final output shaft all extending parallel to each other and perpendicular to the axis of said driven shaft, a first cluster of first and second gears rotatably journaled on said input shaft, a third gear rotatably journaled upon said input shaft at a space location from said first cluster, first shifting means interposed between said first cluster and said third gear for selectively coupling either of said first cluster and said third gear for simultaneous rotation with said input shaft, a fourth gear affixed for rotation with said lay shaft and in mesh with said second gear, a fifth gear rotatably journaled upon said lay shaft in mesh with said third gear, said fifth gear having a hub portion, a sixth gear rotatably journaled on said hub portion and juxtaposed to said fourth gear, a seventh gear rotatably journaled upon said hub portion and juxtaposed to said fifth gear, said sixth gear and said seventh gear being spaced apart, second shifting means interposed between said sixth gear and said seventh gear for selectively coupling either of said sixth gear and said seventh gear for simultaneous rotation with said fifth gear, a second gear cluster rotatably journaled upon said reverse shaft and comprising an eighth gear in mesh with said seventh gear and a ninth gear in mesh with said first gear, and means for driving said driven shaft from said fourth gear.

* * * * *